Patented Mar. 3, 1953

2,630,411

UNITED STATES PATENT OFFICE 2,630,411

SURFACE ACTIVE ALKYL BENZENE SULFONATE COMPOSITION

Jay C. Harris, Dayton, Ohio, assignor to Monsanto Chemical Company, St. Louis, Mo., a corporation of Delaware No Drawing. Application July 16, 1949, Serial No. 105,278

2 Claims. (Cl. 252—353)

This invention relates to an alkylbenzene sulfonate composition prepared by the use of polymer olefins and in particular to a combination of certain alkylbenzene sulfonates having advantageous properties when dissolved in water solutions.

The preparation of alkylbenzene sulfonates from polymer olefins and uses therefor are described in Kyrides U. S. Patents Nos. 2,232,117 and 2,232,118. It is also known that alkylbenzene sulfonates may be prepared by condensing chlorinated aliphatic hydrocarbons, such as kerosene with aromatic hydrocarbons employing a Friedel-Crafts catalyst for the alkylation and then sulfonating the alkyl aromatic hydrocarbons.

The present alkylbenzene sulfonate composition is designed to be sold in the form of water solution having a concentration considerably higher than that employed during the ultimate use thereof. The present products are suitable for solution in water so as to form a concentration up to 30% by weight. This solution may be further diluted to a lower concentration by the simple addition of sufficient water thereto. In this manner textile treating solutions, such as baths for wetting out purposes in textile scouring, bleaching, dyeing, fulling, etc. may be prepared.

The concentrated aqueous solutions of 25% and up to 30% of alkylbenzene sulfonates previously prepared and sold have been found to form turbid solutions when solutions are subjected to lower temperatures. Due to the fact that commercial handling of these solutions often resulted in the exposure thereof to low temperatures approaching the freezing point, the solution obtained by the user was often objectionably turbid. It was, accordingly, desired to provide a composition consisting of alkylbenzene sulfonates which is capable of forming a non-turbid solution and which also could be subjected to low temperatures and which, when again warmed to room temperature, is clear and unclouded with precipitated matter.

It is, accordingly, an object of this invention to provide a mixture of alkylbenzene sulfonates having properties of forming clear water solutions in concentrations up to and including 30% by weight, which are non-turbid at lower temperature and which remain clear after having been subjected to lower temperatures.

I have now found that mixtures of alkylbenzene sodium suflonates containing from 60% to 70% by weight of an alkylbenzene sodium sulfonate, wherein the alkyl group is derived from an olefin fraction averaging 9 carbon atoms, together with 40% to 30% of an alkylbenzene sodium sulfonate, wherein the alkyl group is derived from an olefin fraction averaging 12 carbon atoms, may be dissolved in water to form a 30% solution thereof and that the so-formed solution initially formed is clear and may also be subjected to low temperatures approaching the freezing point thereof and again warmed to room temperature without the formation of turbidity therein.

This invention is illustrated by means of the following examples:

Example 1

A commercial propylene polymer olefin is fractionated at atmospheric pressure and the material boiling over the range of 118° C. to 142° C. is recovered. The olefin product so obtained averages 9 carbon atoms.

Benzol is alklated using the above olefin fraction and the $C_9$ alkylbenzene so obtained is sulfonated as described in said Kyrides patents. The sulfonic acid is neutralized with soda to form the corresponding sodium sulfonate.

A commercial propylene polymer olefin is fractionated at atmospheric pressure and the material boiling over the range of 175° C. to 225° C. recovered. The olefin product so obtained averages 12 carbon atoms.

Benzol is alkylated using the above olefin fraction and the $C_{12}$ alkylbenzene so obtained is then sulfonated also as described in said Kyrides patents. The neutralization of the above product with soda gives the corresponding sodium sulfonate.

Example 2

A mixture consisting of by weight 70% of the $C_9$ alkylbenzene sodium sulfonate and 30% of the $C_{12}$ alkylbenzene sodium sulfonate was dissolved in water in sufficient amount to produce a 30% solution.

The solution was cooled, whereupon it solidified when a temperature of 13° F. was reached. Upon warming the solution again to a temperature of 30° F. no turbidity was developed. A commercial $C_{12}$ alkylbenzene sodium sulfonate examined in like manner solidified at a temperature of 16° F. and upon heating to 30° F. was turbid. The turbidity was not dissipated until, upon further heating, a temperature of 34° F. was reached.

Example 3

A mixture consisting of by weight 60% of the $C_9$ alkylbenzene sodium sulfonate and 40% of the $C_{12}$ alkylbenzene sodium sulfonate was dissolved in water in an amount to form a 30% solution, the solution was cooled, whereupon it solidified when a temperature of 15° F. was reached. Upon again warming the solution to a temperature of 30° F. no turbidity was observed.

Since the present products are designed to be used largely as wetting and penetrating agents in aqueous solution, it is, of course, desirable that the mixture retain the effective surface-active properties of the $C_{12}$ alkylbenzene sodium sulfonate. It has been found that within the limits stated herein the present compositions have substantially the same wetting speed as does the commercial dodecylbenzene sodium sulfonate.

What I claim is:

1. A mixture of alkylbenzene sodium sulfonates consisting of 60% to 70% by weight of alkylbenzene sodium sulfonate wherein the alkyl group averages 9 carbon atoms and is derived from a propylene polymer fraction boiling over the range of 118° C. to 142° C. with from 40% to 30% by weight of an alkylbenzene sodium sulfonate wherein the alkyl group averages 12 carbon atoms and is derived from a propylene polymer fraction boiling over the range of 175° C. to 225° C.

2. An aqueous solution containing 30% by weight of a mixture of alkylbenzene sodium sulfonates, said mixture consisting of 60% to 70% by weight of alkylbenzene sodium sulfonate wherein the alkyl group averages 9 carbon atoms and is derived from a propylene polymer fraction boiling over the range of 118° C. to 142° C. with from 40% to 30% by weight of an alkylbenzene sodium sulfonate wherein the alkyl group averages 12 carbon atoms and is derived from a propylene polymer fraction boiling over the range of 175° C. to 225° C.

JAY C. HARRIS.

REFERENCES CITED

The following references are of record in the file of this patent:

UNITED STATES PATENTS

| Number | Name | Date |
|---|---|---|
| 2,232,117 | Kyrides | Feb. 18, 1941 |
| 2,448,184 | Lemmon | Aug. 31, 1948 |
| 2,450,585 | D'Ouville | Oct. 5, 1948 |
| 2,457,146 | Grote | Dec. 28, 1948 |
| 2,467,130 | Hunt | Apr. 12, 1949 |
| 2,469,378 | Flett | May 10, 1949 |
| 2,477,383 | Lewis | July 26, 1949 |